Patented Jan. 13, 1942

2,270,046

UNITED STATES PATENT OFFICE 2,270,046

TREATMENT OF PLANT STEM CUTTINGS

Nathaniel Hew Grace, Ottawa, Ontario, Canada, assignor to The Honorary Advisory Council for Scientific and Industrial Research, Ottawa, Ontario, Canada, a corporation of Canada No Drawing. Application November 30, 1939, Serial No. 306,970

5 Claims. (Cl. 47—58)

This invention relates to a composition of matter for the treatment of plant stem cuttings for initiating root formation and growth in the commercial propagation of plants.

In very recent years the use of synthetic, organic, plant hormone chemicals, as distinct from the animal hormones, has made available a new art in the propagation of plants but owing to the potency of these chemicals their use is hazardous and uncertain unless surrounded by highly skilled and expert technical control.

The object of the present invention is to provide a composition which can be widely used for this treatment of plant stem cuttings, which is balanced in relation to its positive and negative functions respecting root initiation and growth, so that maximum benefit of the plant hormone chemicals is obtained, and which in use requires but simple technique without highly skilled control.

In the treatment of plant stem cuttings with these hormone chemicals applicant has found that cuttings of numerous plants lack sufficient reserve vitality for the satisfactory initiation and growth of a root system requisite for subsequent growth, and that the presence of fungal or bacterial infections may substantially if not completely nullify the effect of the hormone chemical. The specific object of the present invention is to provide a dust containing hormone chemical, nutrient and disinfectant or fungicide in balanced proportions, such that the dust may be widely used in the commercial propagation of plants from stem cuttings and without intensive highly skilled control.

In accordance with the invention there is intimately incorporated in a synthetic hormone chemical dust mixture 2 to less than 100 parts of an organic mercurial disinfectant per million parts of dust by weight and 0.1 to 5% of a nutrient material, such as sugar, potassium acid phosphate, calcium acid phosphate, ammonium sulphate or the like or mixtures of these.

As disinfectant or fungicide the alkyl mercury halides or phosphates, for example ethyl mercuric bromide and ethyl mercuric phosphate may be used. Talc forms a suitable adherent dust carrier but others may be used, such as chalk, silica, clay, gypsum, charcoal and the like.

As hormone chemicals the following may be used, indolyl acetic acid, indolyl butyric acid, indolyl propionic acid, alpha-naphthyl acetic acid, gamma-1-naphthyl butyric, and epsilon-1-naphthyl hexoic acid, their salts and esters. A mixture of gamma-1 and 2-naphthyl butyric acid is quite effective and may be more economical than the gamma-1-naphthyl butyric acid. The naphthyl acids with an even number of carbon atoms in the side chain are more effective than those with an odd number. When used in the present composite mixture it is sometimes beneficial to use higher hormone chemical concentrations. For example, 5000 p. p. m. have been found beneficial in rooting dormant spruce cuttings.

In use the cut lower or basal end of the plant stem cuttings are dipped into the composite dust mixture, excess dust is shaken off and the treated cuttings are planted. The cuttings may be moistened before dipping into the dust.

To illustrate the effect of the composition the following examples are given:

In the treatment of Coleus blumei, a talc dust containing 1000 parts per million by weight of hormone chemical increased the number of roots per rooted cutting by about 50%. When treated with the composition of the present invention there was a further increase in the number of roots per rooted stem cutting of substantially 29%. With 1% of cane sugar in the mixture there was an increase in the length of the roots of about 13%. With 100 p. p. m. of the organic mercurial disinfectant there was a decrease in the length of the roots of about 12%.

In the treatment of Iresine lindeni, with a dust containing 1000 p. p. m. of hormone chemical the number of roots per rooted cutting was increased but not significantly. When treated with the present composite mixture there was a marked increase in the number of roots per stem cutting, the peak effect occurring with about 50 p. p. m. of the organic mercurial disinfectant. With 100 p. p. m. of the disinfectant there was an increase in the number of roots but is was significantly less than with the lower proportions of the disinfectant.

In the treatment of Weigelia rosea with hormone chemical dust the number of dead cuttings was reduced but not significantly. The addition to the dust of 50 p. p. m. of ethyl mercuric bromide reduced death by about 20% and the further addition of 0.1% of potassium acid phosphate showed highly significant effects, reducing the proportion of dead cuttings by about 30%. The addition of 1% of the nutrient while helpful was not as good as the lower proportion and more than substantially 5% actually increased the death rate.

In treating Deutzia lemoine with hormone dust rooting was increased by about 100%. The addition of 50 p. p. m. of ethyl mercuric bromide gave a further increase in rooting of about 30%. The addition to the hormone dust of 0.1% of KH₂PO₄ failed to increase rooting significantly but in conjunction with 50 p. p. m. of the disinfectant the rooting was increased by about 45%.

In the treatment of dormant stem cuttings of *Physocarpus opulifolius,* the usual hormone dust failed to increase the percentage of cuttings rooted. The addition of 50 p. p. m. of ethyl mercuric phosphate increased rooting by 19% and increased the dry root weight by as much as 61%. The addition of 5% of sugar increased the length of roots by about 20%.

The treatment of stem cuttings of *Lonicera tartarica,* with the normal hormone chemical dust mixture failed to significantly increase the weight of fresh roots. A substantial increase occurred when 5% of sugar was added. The average weight of green leaves produced was reduced by the addition of sugar but the addition of less than 100 p. p. m. of ethyl mercuric phosphate produced an increase in the weight of green leaves and improved the rooting.

The reason for the interaction effect between the nutrient, disinfectant and hormone chemical is not clearly understood but the effect is marked in the treatment of stem cuttings. It is, however, necessary to maintain the proportions of the nutrient and the mercurial within the limits stated if the beneficial interaction effect is to be obtained.

I claim:

1. A method of initiating root formation and growth in plant stem cuttings which comprises causing to adhere to the basal end of cut stem portions of plants dust containing 200 to 5000 parts per million of synthetic organic plant hormone chemical, less than 100 but not less than 2 parts per million of organic mercurial disinfectant and substantially 0.1 to 5% of plant nutrient material, and planting the so-treated cutting.

2. In the planting of stem cuttings of plants, the improved method which comprises causing to adhere by normal contact to cut stem portions of plants dust containing 200 to 5000 parts per million of synthetic organic plant hormone chemical and intimately incorporated therein to interact therewith less than 100 but not less than 2 parts of alkyl mercuric salt per million parts of dust.

3. A rooting composition for use in the method of claim 2 which comprises an intimate mixture of a dust carrier, 200 to 5000 parts of synthetic organic plant hormone chemical per million parts of said dust carrier and less than 100 parts but not less than 2 parts of alkyl mercuric salt per million parts of said dust carrier.

4. A composition as set forth in claim 2 containing substantially 50 parts per million of ethyl mercuric phosphate and substantially 5% of sugar.

5. A composition as set forth in claim 2 containing about 50 parts per million of alkyl mercuric bromide and about 1% of potassium acid phosphate.

NATHANIEL HEW GRACE.